(12) United States Patent
Vozhdaev et al.

(10) Patent No.: US 6,813,942 B1
(45) Date of Patent: Nov. 9, 2004

(54) PITOT-STATIC TUBE WITH STATIC ORIFICES ON AN UPSTREAM PLATE

(75) Inventors: Yevgeny Semenovich Vozhdaev, Moscow (RU); Heinz-Gerhard Kohler, Schoneck (DE); Mikhail Alekseevich Golovkin, M.D. Zhukovsky (RU); Vladimir Alekseevich Golovkin, M.D. Zhukovsky (RU); Anatoli Kuzmich Pankratov, Moscow (RU); Andrei Aleksandrovich Efenov, M.D. Zhutkovsky (RU)

(73) Assignees: Professor N.E. Zhukovsky Central Aerohydrodynamic Institute, Moscow (RU); Aeropribor Voskhod, Moscow (RU); Nord-Micro Elektronik Feinmechanick AG, Frankfurt am Main (DE)

( * ) Notice: Subject to any disclaimer, the term of this patent is extended or adjusted under 35 U.S.C. 154(b) by 0 days.

(21) Appl. No.: 09/720,494

(22) PCT Filed: May 26, 1999

(86) PCT No.: PCT/EP99/03632

§ 371 (c)(1),
(2), (4) Date: May 2, 2002

(87) PCT Pub. No.: WO99/61924

PCT Pub. Date: Dec. 2, 1999

(30) Foreign Application Priority Data

May 26, 1998 (RU) .......................................... 98109993

(51) Int. Cl.$^7$ ................................................. G01N 1/00
(52) U.S. Cl. ..................................................... 73/170.02
(58) Field of Search ............................. 73/170.02, 180, 73/861.65, 861.66, 184

(56) References Cited

U.S. PATENT DOCUMENTS

| 4,378,696 A | | 4/1983 | DeLeo et al. |
| 4,833,911 A | * | 5/1989 | Zeeban et al. ............. 73/117.4 |
| 5,466,067 A | * | 11/1995 | Hagen et al. ................ 374/138 |
| 5,616,861 A | * | 4/1997 | Hagen .......................... 73/180 |
| 5,731,507 A | | 3/1998 | Hagen et al. |

FOREIGN PATENT DOCUMENTS

WO    WO 94 02858 A    2/1994

* cited by examiner

*Primary Examiner*—Harshad Patel
(74) *Attorney, Agent, or Firm*—Stephen B. Salai, Esq.; Brian B. Shaw, Esq.; Harter, Secrest & Emery LLP

(57) ABSTRACT

A Pitot-Static tube including three groups of orifices for determining the total pressure, static pressure and angle of attack, an axially symmetric body and a strut for fastening to pneumatic paths arranged between them and to electric heating elements. In order to reduce the aerodynamic drag of the Pitot-Static tube and the power required for heating the anti-icing system, the orifices for measuring the static pressure are arranged on a plate upstream of the strut.

11 Claims, 9 Drawing Sheets

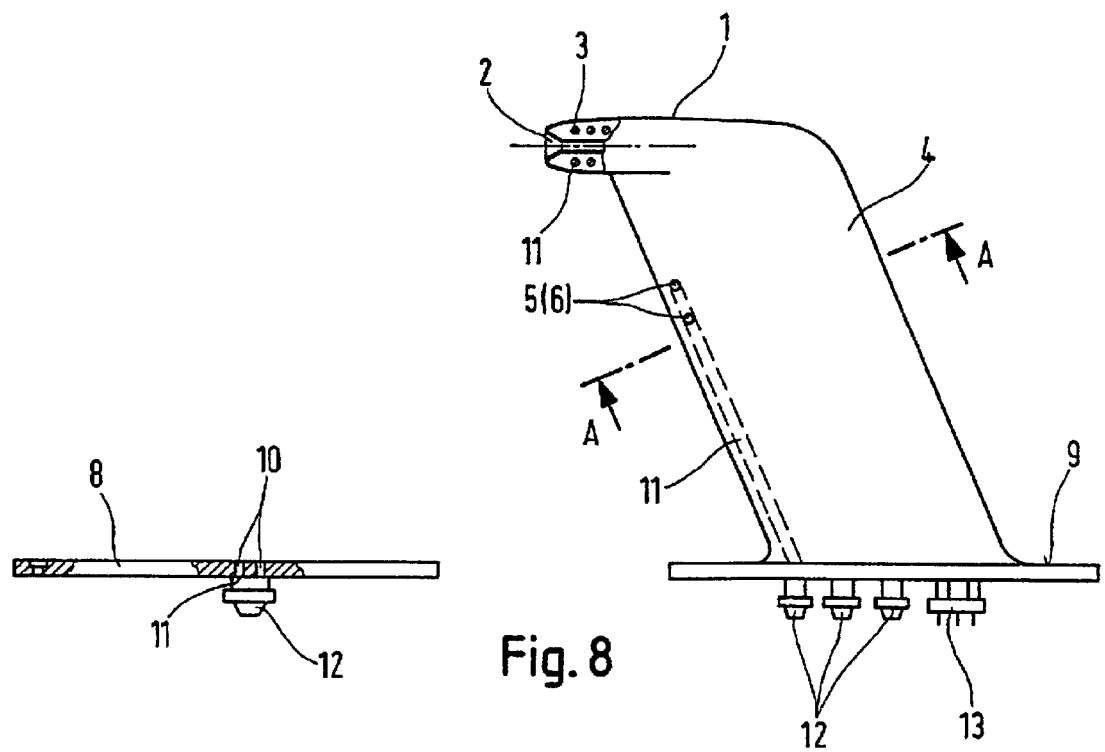
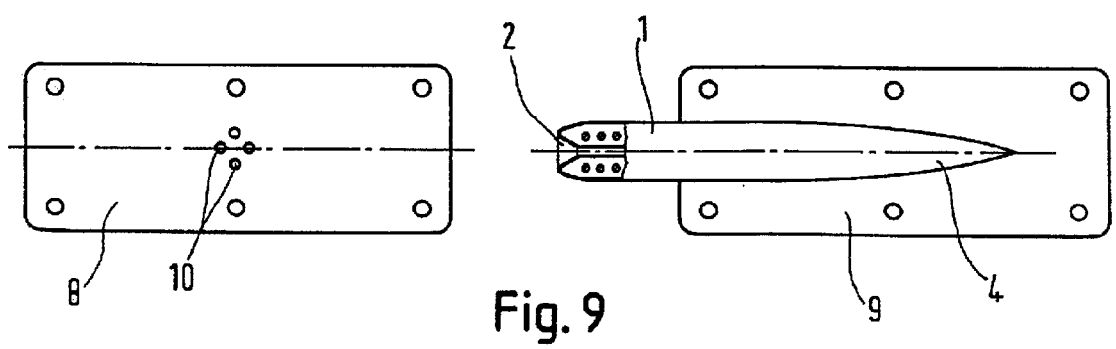
Fig. 9
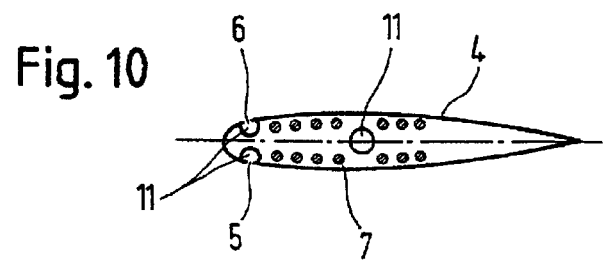
Fig. 10

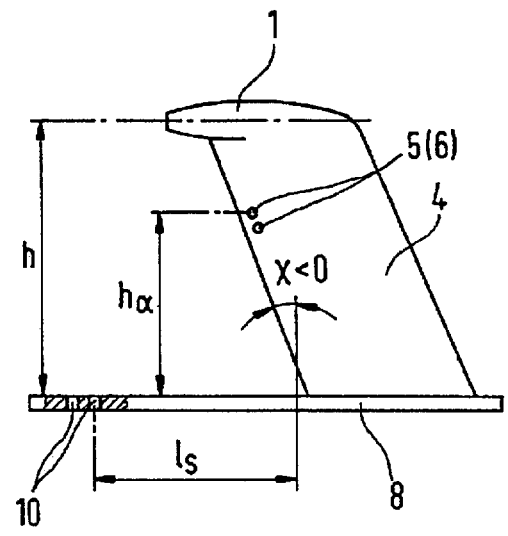
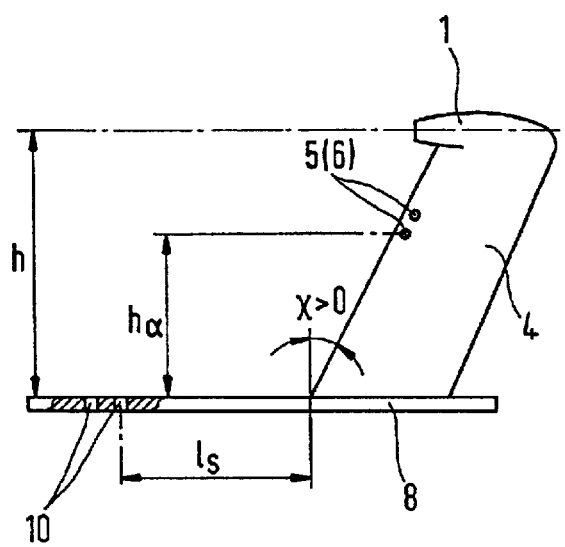
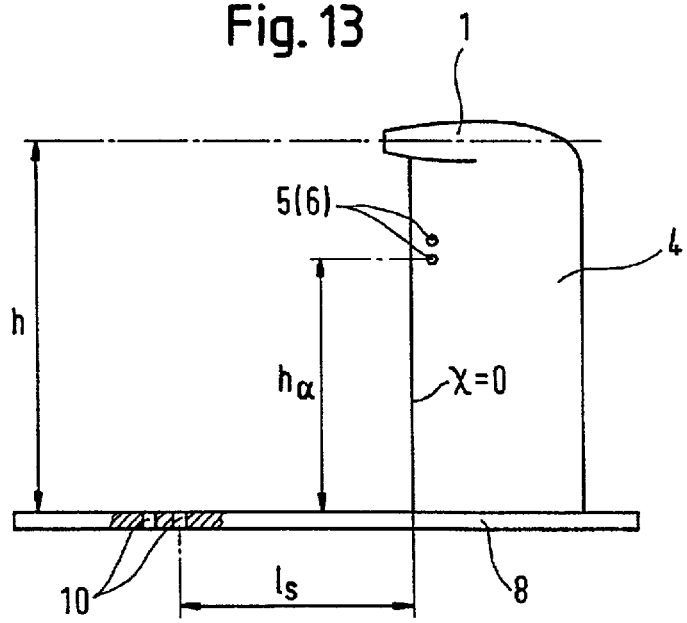

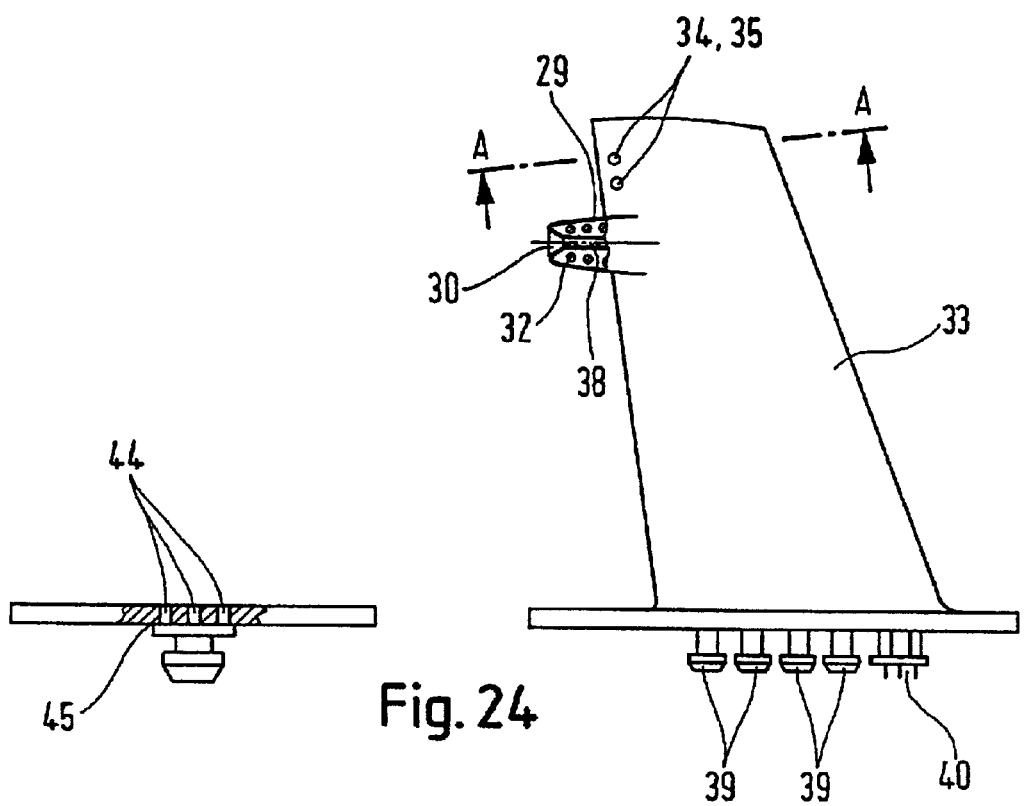
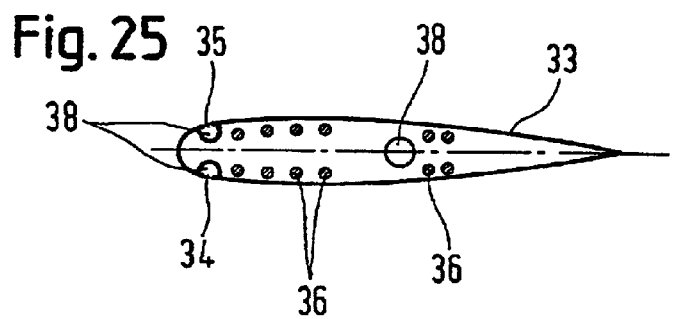
Fig. 24
Fig. 25
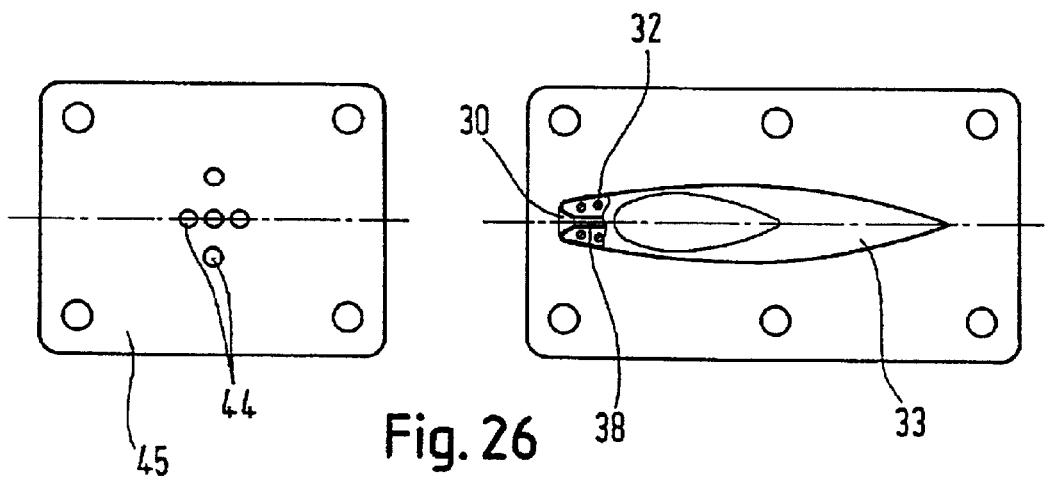
Fig. 26

PITOT-STATIC TUBE WITH STATIC ORIFICES ON AN UPSTREAM PLATE

The invention relates to the determination of the flight parameters of flying vehicles or to other fields of science and technology which deal with flows of liquid and gas.

The measurement of flight parameters is one of the most important problems in the aeromechanics and aerodynamics of flying vehicles (FVs). At the present time, to measure flight parameters (flow parameters) use is made of Pitot-Static tubes (PSTs) which are frequently mounted directly on the fuselage of the aircraft or the body of some other flying vehicle, and which actually measure the parameters of local flow close to a planar flow. As a rule, some of these PSTs which measure local flow parameters are mounted on the flying vehicles. The actual flight parameters are determined on the basis of prior calibrations.

A Pitot-Static tube is known from WO 94/02858. The known PST is mounted on the body or fuselage of an FV and has a cylindrical tube which is mounted on a strut having curved leading and trailing edges which come together when approaching from the base of the strut to the tube. The leading edge of the strut can be rounded. The Pitot-Static tube has orifices in the nose part of the tube for sensing the total pressure and orifices for sensing the static pressure at a certain distance from the nose of the tube. The Pitot probe has a heater for preventing the formation of ice. However, this PST cannot be applied to determine the angle of attack, since it lacks orifices for sensing pressure with the aid of which the angle of attack can be measured. Strictly, as follows from WO 94/02858, this Pitot probe is not designed for these purposes. Moreover, the convergence of the strut in a side view when the tube is approached leads to a sharp rise in the relative thickness of the profiles of the cross sections of the strut, while maintaining the internal volumes required for constructing the pneumatic paths and heaters. At high subsonic speeds (Mach number M=0.8–0.9), this leads to an earlier occurrence of local shock waves and a sharp rise in the shock-wave drag of such a Pitot-Static tube.

Another device for determining total pressure $P_0$, static pressure $P_s$, and therefore also the Mach number M, as well as the angle of attack $\alpha$ is known from RU 2 000 561. Said device consists of a body constructed in the form of a plate sharpened at the front whose upper surface is arranged orthogonal to the axis of rotation and is equipped with orifices for measuring static pressure. Arranged in the rear part of the plate on its upper surface is a half-wing with a straight leading edge, which is orthogonal to the upper surface of the plate and on the end of which a total pressure probe is arranged. Orifices for measuring the angle of attack are arranged on the straight leading edge of the half-wing. Orifices for measuring the static pressure, the total pressure probe and orifices for measuring the angle of attack with the aid of corresponding pneumatic paths are connected to pressure transducers. The device is also equipped with a transducer for the angular displacement of the body. The orifices for measuring static pressure can be arranged on a non-rotating disc constructed flush with the upper surface of the plate. In essence, this device combines within itself the functions of an aerodynamic-angle transducer and a Pitot-Static tube. The given device has a number of disadvantages. Firstly, there is the complexity of design, which is caused firstly by the fact that the device is a rotating one. Consequently, it must be equipped with bearings with a very low coefficient of friction, it being necessary for the device to be statically and dynamically balanced. Moreover, it must be equipped with a transducer for the angular displacement of the body. The second disadvantage which, in essence, follows on from the first is an increased design weight. It is also a disadvantage of the given device that because of its design features it is impossible for the total pressure to be transmitted to the fuselage of the flying vehicle, to different consumers, and such a need frequently exists, with the aid of non-rotating pneumatic paths. Transmitting pressure from a rotating part of a device onto a non-rotating one requires the application of special seals and leads to complication of the design and a rise in its weight, to an increase in the friction-force moment and, consequently, to a rise in the minimum magnitude of the rate at which such a device starts to operate.

U.S. Pat. No. 4,378,696 teaches a fuselage PST for determining flight (flow) parameters—the angle of attack $\alpha$ total pressure $P_0$ and static pressure $P_s$ and, consequently, Mach number M, which is an elongated axially symmetric body with a conical or ogival head part, where orifices for sensing total pressure are arranged, which merges into a circular cylinder on the surface of which orifices for sensing static pressure are arranged. Furthermore, this cylindrical surface merges into a conical one on which there are arranged orifices for sensing pressure in accordance with which the angle of attack is set, and thereafter into a cylindrical one again. For the purpose of being fastened to the fuselage or to the body of the FV, the Pitot probe has a strut whose cross section has a lenticular profile with a sharp leading edge The disadvantages of the given PST are:

increased overall dimensions of the axially symmetric body;

complexity of design increased aerodynamic drag;

increased required power of the heating anti-icing system;

low sensitivity of pressures measured in orifices arranged on the conical part (and intended for determining $\alpha$, in terms of the angle of attack, and this leads to larger errors in the determination of the angle of attack; and increased design weight.

This is caused by the following factors:

1. The given PST has an enlarged mid-section of the axially symmetric body. The enlarged dimension of the mid-section is caused in this case by two circumstances.

Firstly, the cylindrical part of the axially symmetric body merges into a conical one on which there are arranged orifices for sensing pressure by means of which the angle of attack is determined. In order to somewhat enhance the sensitivity of the pressure sensed by means of these orifices in accordance with the angle of attack, the cone angle must be sufficiently large, and this leads to the necessity of significantly increasing the diameter of the axially symmetric body downstream of the given conical part. The second circumstance is associated with the fact that although the groups of orifices for measuring pressure, by means of which total pressure, static pressure and the angle of attack are determined, are dispersed in the given configuration, they are all still located on the same axially symmetric body. It is necessary to arrange inside it pneumatic paths, which go out from all the indicated groups of orifices, and also tubular electric heaters (TEHs) of the anti-icing system. The diameters of the pneumatic paths and of the TEHs cannot be less than certain minimum values which are determined for the pneumatic paths by the magnitude of the hydrodynamic lag, and for the TEHS by the maximum values of the heat flux density and the temperature of the surface of the heaters. The result is a high design saturation, that is to say a high design complexity of the axially symmetric body of the PST.

The circumstances indicated lead to an enlargement of the area of the mid-section, and thus to a rise in the design weight, the aerodynamic drag and the power of the anti-icing system. It is also necessary to note that the transition from a cylindrical part to a conical one, and thereafter to a cylindrical one again can lead to flow separation downstream of the conical part and to an earlier appearance (in terms of the Mach number) of local shock waves. In its turn, this must lead to a rise in aerodynamic drag. Moreover, an enlarged diameter of the axially symmetric body and the non-optimum shape of its aerial part in conjunction with the strut also produces unfavourable aerodynamic interference (flow separation and an earlier appearance of shock waves) in the region of the joint of the tapering tail part of the axially symmetric body of the PST downstream of the line of maximum thickness of the lenticular aerodynamic profile of the strut. This also leads to a certain increase in the aerodynamic drag of such a PST.

2. Increased length of the axially symmetric body. This is caused by the fact that all three groups of orifices are arranged on the axially symmetric body: for measuring the total and static pressure and the angle of attack. In this case, the orifices for measuring static pressure must be located sufficiently far from the strut so that measurements of the static pressure are accurate (without the introduction of corrections) and so that the over-pressure from the strut is virtually excluded. This leads to a significant increase in the length of the axially symmetric body. As is known, the formation of ice on a flying vehicle takes place, in the first instance, in regions adjoining regions of flow deceleration. [sic] (see, for example, Bragg M. B., Grigoreh G. M., Lee J. D. Airfoil Aerodynamic in Icing Conditions. J. Aircraft, vol. 23, N1, 1986). Such a region on the axially symmetric body of the PST is the nose region, and also, in the case of angles of attack differing from zero, the region in the vicinity of the line of the spread of flow on the windward part of the axially symmetric body of the PST. Consequently, quite massive tubular electric heaters are arranged inside such an elongated axially symmetric body over its entire length. This leads to a significant rise in the power required for heating, and also to an additional increase in the design weight, since the TEffs are quite massive. It should also be noted that the presence of a conical part on the axially symmetric body of the PST leads to the implementation of an additional over-pressure effect on the cylindrical part situated at the front, where the orifices for measuring static pressure are arranged. As a result, the accurate determination (without the introduction of corrections) of the static pressure requires the orifices for sensing it to be located sufficiently far from this conical part. This leads to the necessity of additionally increasing the length of the axially symmetric body, something which also leads to a certain additional increase in the design weight, and requires additional power for the electrically heated anti-icing system.

3. The electric heaters arranged inside the strut of the PST for preventing the formation of ice on its leading edge, and therefore for preventing the influence of this ice on the measurement of the pressure on the axially symmetric body, are not used with adequate effectiveness, in the sense that they heat the strut on which no orifices for measuring pressure are arranged. This leads to a significant rise in weight and the electric power consumed.

The aim of the invention is to eliminate the disadvantages enumerated above.

The technical result consists of the following:

reduction in the aerodynamic drag of the strut and the axially symmetric body of the PST;

reduction in the power required for the heated anti-icing system;

design simplification;

reduction in the overall dimensions of the axially symmetric body; and lowering of the design weight.

The technical result is achieved by virtue of the fact that the Pitot-Static tube including three groups of orifices for determining the total pressure, static pressure and angle of attack, an axially symmetric body and a strut for fastening to pneumatic paths arranged between them and to electric heating elements of the anti-icing system is constructed in such a way that the orifices for measuring the static pressure are arranged on a plate up-stream of the strut.

To advantage, the orifices for determining the angle of attack are arranged on the strut. Said orifices are arranged on said strut between its nose and a position of its maximum thickness. Accordingly, the orifices are arranged in a region $X=0 \ldots X_C$, wherein $X_C$ is a position of maximum thickness. $X_C$ is determined by the following equation:

$$C(X_C) \leq C(X \neq X_C)$$

wherein $C(X)$ is the profile thickness at a distance X from the profile nose.

For the purpose of an even greater reduction in the aerodynamic drag of the fuselage of the probe, the tail part of the axially symmetric body can terminate and mate smoothly with the aerodynamic profile of the strut in the region of its maximum relative thickness.

It is sometimes expedient, starting from design considerations, or from aerodynamic ones, to measure the static pressure on the FV at one point thereof, and to measure the total pressure and angle of attack at another. It is possible in this case for measurement purposes to apply the proposed fuselage probe, in which the plate with the orifices for measuring static pressure is constructed separately from the axially symmetric body with the strut.

For the purpose of application to supersonic flight regimes of the FV, when a very narrow range of angle of attack is required, the cross sections of the strut can have an aerodynamic profile with a sharpened nose.

For the purpose of application to FVs which are being used at subsonic M numbers, the cross sections of the strut can have a subsonic aerodynamic profile with a rounded nose.

For the purpose of widening the range of measurements of the angle of attack, the external surface of the strut can take the form of a cylindrical surface.

For the purpose of additionally widening the range of measurements of the angle of attack, the orifices for measuring the angle of attack can be arranged on the strut from its nose up to the maximum thickness.

For the purpose of an even greater reduction in the power required for the anti-icing system, the electric heating elements of the anti-icing system can be offset towards the leading edge of the strut.

In a preferred embodiment, the orifices for determining the angle of attack are arranged on the strut above the axially symmetric body in relation to the base of the MM Such an arrangement permits enhancement of the accuracy of determination of the angle of attack; and enhancement of the accuracy of measurement of the static pressure for transonic flow regimes.

Additionally, said arrangement permits a reduction in the influence of the angle of slip on measurement of the local angle of attack. This is achieved by virtue of the fact that the vortex wake from the axially symmetric body given slippage of the FV does not fall into the orifices for measuring the angle of attack.

Since the aerodynamic drag of the axially symmetric body for a zero angle of attack of the PST, and for high subsonic or supersonic speeds is proportional to the area of its mid-section, the lowering of the aerodynamic drag of the PST, were it to have the same shape as the prior-art PST, would also be proportional to the difference of the squares of the diameters of the axially symmetric body of the prior-art PST and the proposed PST. However, since the shape of the axially symmetric body of the proposed PST has no additional steps (conical step with subsequent thickening) as in the case of the prior-art PST, there will be no flow separation on it nor the appearance of shock waves downstream of the conical step. Thus, the lowering of the aerodynamic drag will be even greater. At large angles of attack, the lowering of the drag will also be very significant due to the fact that the length of the axially symmetric body on the proposed PST is substantially less than on the PST example of the prior art. Since there is no need to feed power for heating the plate on which the orifices for measuring static pressure are situated, in the case of the proposed PST because of its lack of conditions for icing (there being no regions of flow deceleration on it), and the required power for heating the strut on which the orifices for determining the angle of attack are situated is approximately equal to the required power for heating the strut of the prior-art PST, the lowering of the power required to heat the proposed PST is determined by the lowering of the power for heating the axially symmetric body. This lowering is proportional to the difference between the areas of the external surfaces of the axially symmetric body of the prior-art PST and the proposed PST (given the same temperature of their surfaces). Because the power required to heat the axially symmetric body of the prior-art PST is approximately equal to the power required by the strut, as a result, according to approximate estimates, the power required by the electric heaters on the proposed PST can be lowered by approximately 50% by comparison with the prior-art PST. Since the staggering of the orifices on the plate for measuring static pressure without the introduction of corrections to the overpressure relative to the base of the strut of the PST and, on account of its sweep, can be appreciably reduced by comparison with the corresponding orifices of the prior-art PST on the axially symmetric body, the weight of the plate and the axially symmetric body of the proposed PST can, as indicated by preliminary design studies, be approximately equal to the weight of the external shell of the axially symmetric body of the prior-art PST. As a result, the lowering of the design weight of the proposed PST occurs only by virtue of the lowering of the mass of the heaters in the axially symmetric body. This lowering of the weight is approximately 15–20% of the weight of the PST.

When the axially symmetric body is constructed in such a way, that its tail part terminates and merges smoothly with the strut in the region of its maximum thickness, the interference of the axially symmetric body and strut improves, and there is an additional substantial reduction in the aerodynamic drag of the PST because of the absence of an additional diffuser. In the case when for design, aerodynamic or some other considerations, the plate on the FV has to be situated on the fuselage at a location where the static pressure is implemented, while the strut with the axially symmetric body of the PST has to be situated at a different location, the plate with the orifices for measuring static pressure is constructed separately from the axially symmetric body with the strut. For the purpose of additionally reducing the drag on supersonic FVs when there is a need for a sufficiently narrow range of measurements of the angle of attack, the cross sections of the strut can have an aerodynamic profile with a sharpened nose. When the PST is applied on an FV which is employed at subsonic Mach numbers M, for the purpose of additionally reducing the drag and widening the range of measurements of the angle of attack, the cross sections of the strut can have a specialized subsonic aerodynamic profile with a rounded nose. For the purpose of an additional widening of the range of measurements of the angle of attack, the external surface of the strut can be in the form of a cylindrical surface. For the purpose of an additional widening of the range of measurements of the angle of attack, the orifices for measuring the angle of attack can be arranged on the strut away from its nose up to the maximum thickness. Because of the offset of the electric heating elements towards the leading edge of the strut, there is an additional substantial reduction in the useless heat losses by comparison with the prior-art PST, and reduction in the power required for heating.

For the purpose of enhancing the accuracy of determination of static pressure at transonic flow speeds, the aerodynamic profile of the strut can have an exit section on which at least one additional orifice for tapping the static pressure is arranged. For the purpose of simplifying the design and reducing the aerodynamic drag, the strut can be an element of the actual air frame proper of the FV.

By virtue of the fact that the influence of variation in the angle of attack on the magnitude of the pressures measured on the aerodynamic profile is substantially higher than on a cone, the error in the measurement of the angle for the proposed PST is substantially lower than for the prior-art PST, particularly when the orifices are arranged near it.

Moreover, owing to the transfer of the orifices for measuring the angle of attack from the axially symmetric body onto the strut there is a substantial simplification in the design of the axially symmetric body, and a reduction in its diameter and aerodynamic drag.

The reduction in the aerodynamic drag of the strut is achieved by applying the appropriate (subsonic or supersonic) aerodynamic profile. Owing to the offsetting of the electric heaters of the anti-icing system towards the nose of the profile of the strut, which is most subject to icing, it is possible to substantially reduce the power required for heating. Since the phenomenon of transonic stabilization of pressures is lacking in the region of the exit section of the aerodynamic profile, the presence of the orifices for tapping static pressure in the exit section can substantially enhance the accuracy of measurement of the pressure in the case of transonic flow speeds. Arranging the orifices for tapping static pressure on a special plate on the surface of the fuselage also substantially simplifies the design of the PST, and can lower the power required for the anti-icing system, since this substantially simplifies the axially symmetric body, and the plate is not so subject to icing as is the axially symmetric body.

The invention will now be described by way of examples with reference to the accompanying drawings in which:

FIG. 8 shows a variant of the proposed PST on which the plate with the orifices for measuring static pressure is constructed separately from the axially symmetric body with the strut;

FIG. 9 shows a top view of the PST according to FIG. 8;

FIG. 10 shows a section along line A—A in FIG. 8;

Figure 20:
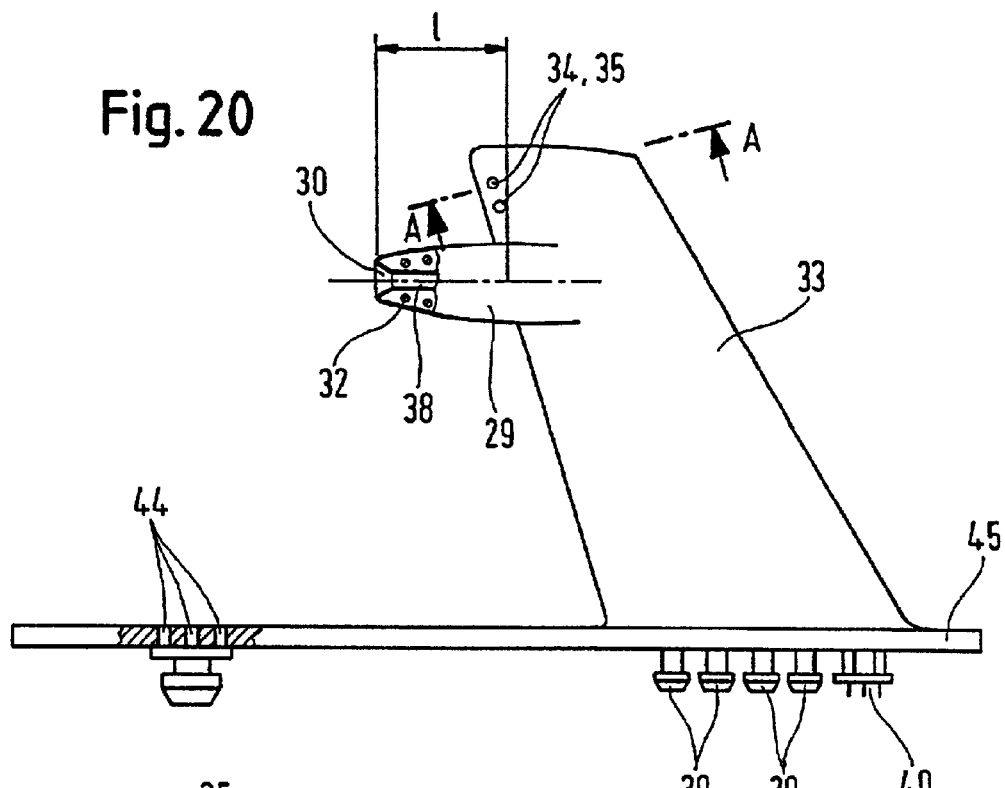
Figure 21:
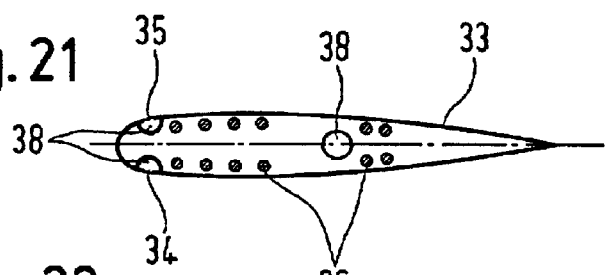
Figure 22:
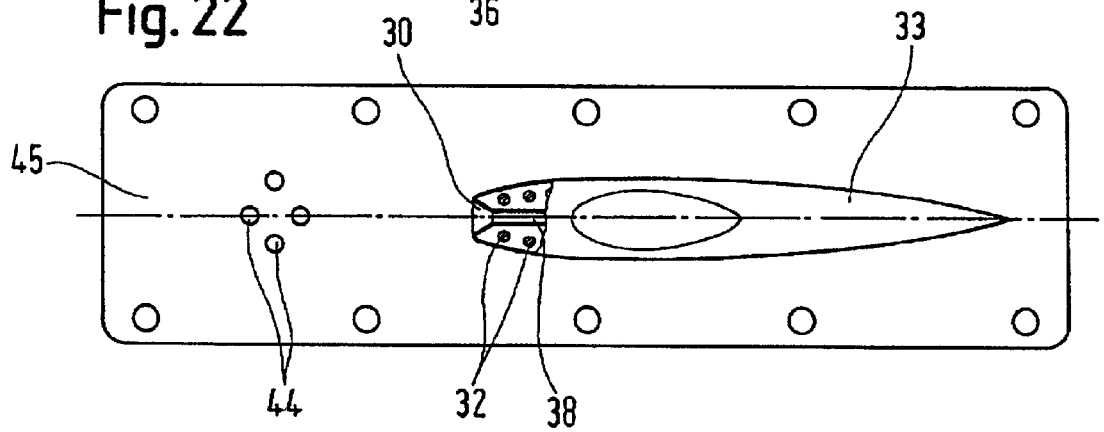
Figure 23:
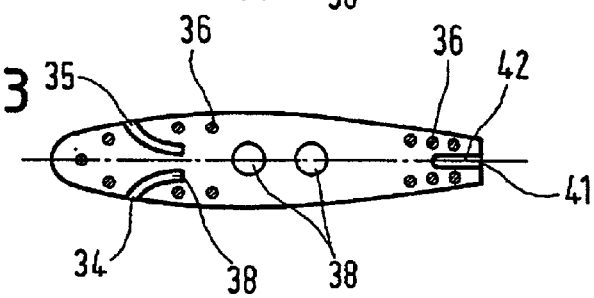

FIG. 11 presents a first variant of the proposed PST with a first sweep of its strut in terms of the leading edge;

FIG. 12 presents a second variant of the proposed PST with a second sweep of its strut;

FIG. 13 presents a third variant of the proposed PST with a third sweep of its strut;

FIGS. 14 to 19 show different variants of the profiles of the strut;

FIG. 20 shows a side view of a further embodiment of the invention;

FIG. 21 shows a section along line A—A in FIG. 20;

FIG. 22 shows a top view of the PST according to FIG. 20;

FIG. 23 shows a side view of another embodiment of the invention;

FIG. 24 shows a different embodiment of a pitot-static tube in accordance with the invention in a section along line A—A in FIG. 20

Figure 27:
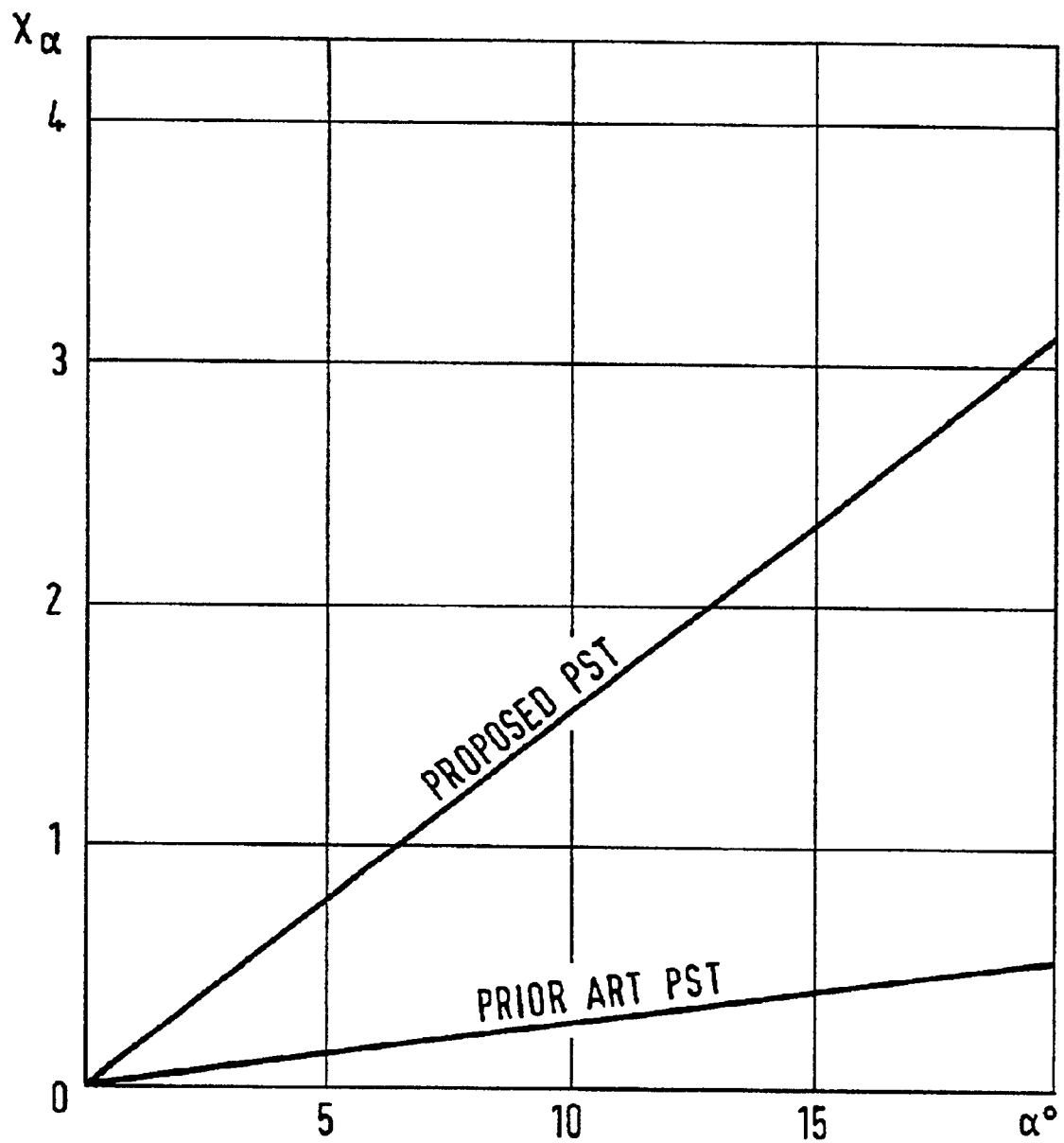
Figure 28:
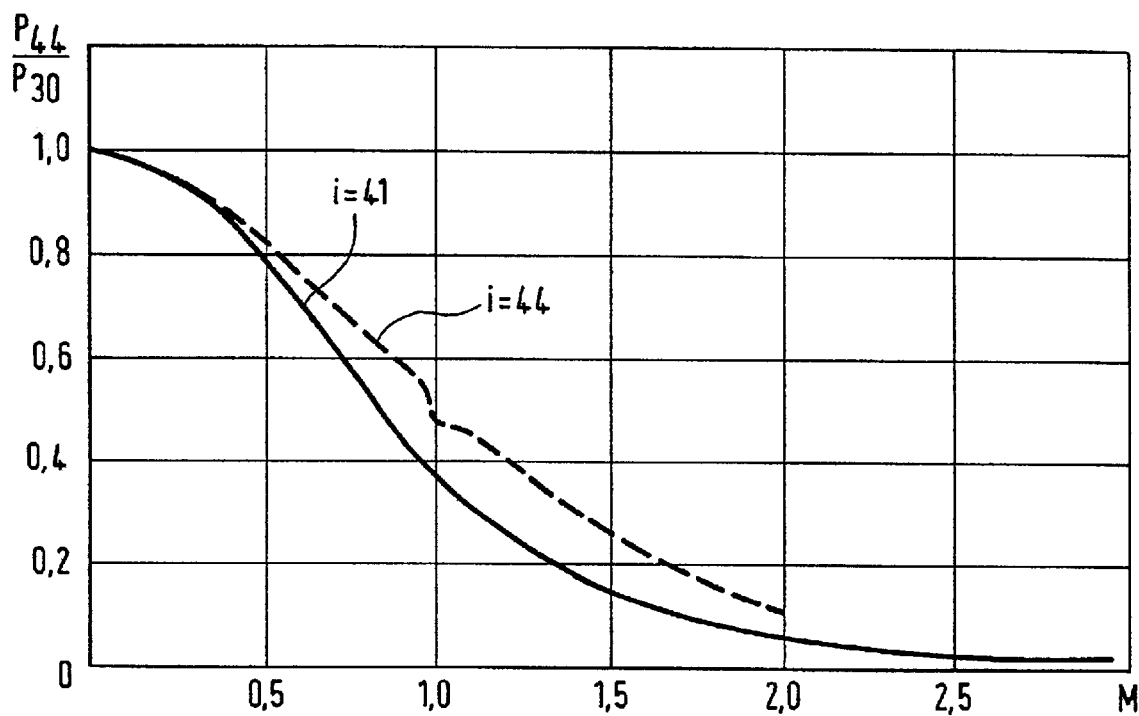

FIG. 25 shows a section along line A—A in FIG. 24;

FIG. 26 shows a top view of the PST according to FIG. 25;

FIG. 27 presents an example of the functional relationship of the calibration slope; and FIG. 28 shows the variation with Mach number in the ratio $P_{44}/P_{30}$.

The Pitot-Static tube shown in FIGS. 1 to 10 comprises an axially symmetric body 1 in the nose part of which there is arranged an orifice 2 for determining the total pressure. TEHs 3 of the anti-icing system are located inside the axially symmetric body 1. The axially symmetric body 1 is fastened to a strut 4 on which there are arranged orifices 5, 6 for determining the angle of attack, and TEHs 7 are arranged inside the strut 4. Several orifices 5, 6 each may be arranged for the purpose of reserving orifices on the upper and lower surface of the cross section of the strut 4. The PST has a plate 8 which can be connected to a flange 9 or is simultaneously a flange 9 for fastening the strut 4 and plate to the fuselage of the FV: orifices 10 for measuring the static pressure are constructed in the plate 8. The pressure from the orifices 2, 5, 6, 10 is led out of the PST with the aid of pneumatic paths 11 and nozzles 12, and the heating of the axially symmetric body 1 and strut 4 of the PST is effected with the aid of electric heaters 3, 7 by means of an electric connector 13.

The orifices 5, 6 are arranged on the strut 4 between its nose and the position $X_c$ of its maximum thickness, as shown in FIGS. 4, 5 and 14 to 19.

The Pitot-Static tube operates in the following way. The pressure sensed by the orifices 2, 5, 6, 10 is transmitted via nozzles 12 to a transducer unit which converts the pressure into electric signals. These electric signals are sent to an information processing unit in which the flow (flight) parameters $P_0$, $P_s$, ao are determined from calibration relationships. Electric energy is fed to the TEHs 3 and 7 via an electric connector 13 in order to prevent the formation of ice which can strongly distort the measurement or lead to clogging of the orifices and failure of the PST. The electric TEHs 3 and 7 heat the external shell of the axially symmetric body and the strut 4, and also the pneumatic paths 11 which are, as a rule, produced from materials which are extremely good thermal conductors (for example, nickel). The power of the THEs and of the electric energy fed is selected so as to prevent the formation of ice on the surfaces of the axially symmetric body 1 and the strut 4, and in the orifices 2, 5, 6.

For the purpose of additionally lowering the aerodynamic drag by improving the interference between the axially symmetric body 1 and the strut 4, the tail part of the axially symmetric body is mated smoothly and terminates in the region of maximum thickness of the strut as shown in FIGS. 4 to 7.

When necessary, starting from design or aerodynamic considerations, the plate 8 with orifices for measuring static pressure can be constructed on the proposed fuselage of the PST separately from the axially symmetric body 1 and the strut 4 as shown in FIGS. 8 and 9.

The design and aerodynamic parameters of the PST are selected starting from the requirements for the operating ranges of the PST and measuring accuracy and flow conditions of the FV. The height h of the PST (see FIGS. 11 to 13) is selected such that the orifice sensing the total pressure is located beyond the limits of the boundary layer. The stagger $l_s$ relative to the strut of the orifices for measuring static pressure on the plate is selected in such a way that the overpressure from the strut 4 does not influence the means Urements, nor do any possible disturbances (for example, shock waves in transonic and supersonic flight regimes). The height $h^\alpha$ of the orifices 5, 6 for measuring the angle of attack α is also selected from consideration of the absence of disturbances. If the PST is intended exclusively for operating at supersonic speeds and at very small angles of attack, the profile can have a lenticular or ogival shape sharpened in the nose. Several possible cross-sections of the strut 4 are shown in FIGS. 14 to 17. For subsonic speeds, it is possible to apply a profile with a rounded nose, which is tuned to its corresponding operating regimes, for example in terms of the Mach number M. Starting from the characteristics of the profiles and operating conditions, the sweep χ of the strut is also chosen to have a leading edge (see FIGS. 11 to 13).

With the aim, for example, of widening the range of measurements of the angle of attack, for very low speeds the profiles of the cross sections of the struts can, in particular, have an elliptical or circular section.

Figure 1:
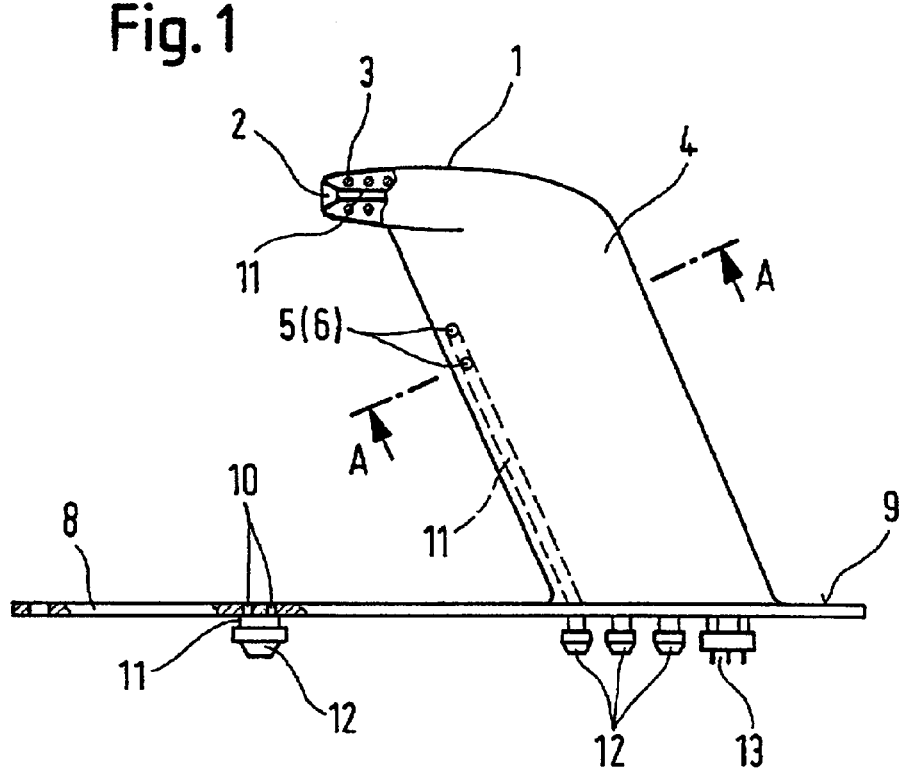
FIG. 1 shows a side view of a first embodiment of a PST in accordance with the invention as optimized for mounting on a medium class passenger aircraft.
Figure 2:
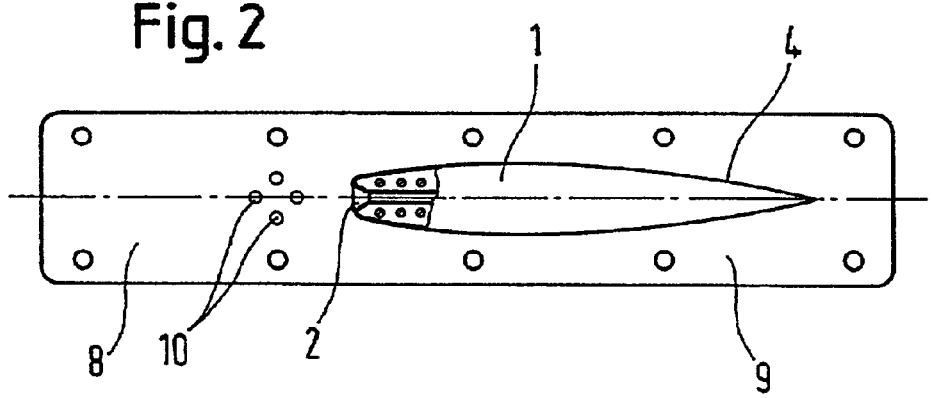
FIG. 2 shows a top view of the PST according to FIG. 1.
Figure 3:
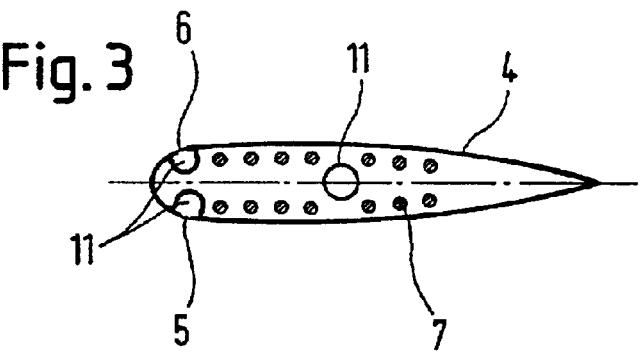
FIG. 3 shows a section along line A—A in FIG. 1.
Figure 4:
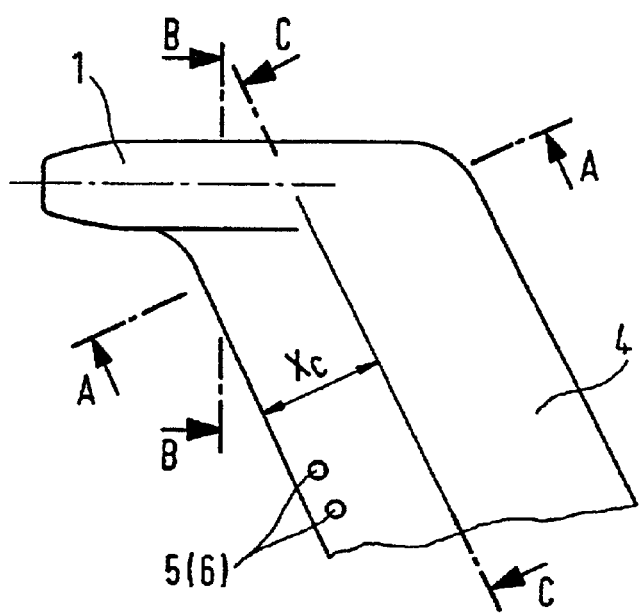
FIG. 4 shows one of the variants of the proposed PST with an axially symmetric body whose tail part terminates and mates smoothly with the strut in the region of its maximum thickness.
Figure 5:
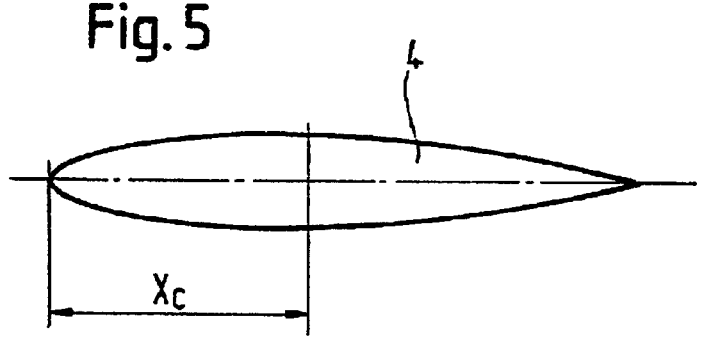
FIG. 5 shows a section along line A—A in FIG. 4.
Figure 6:
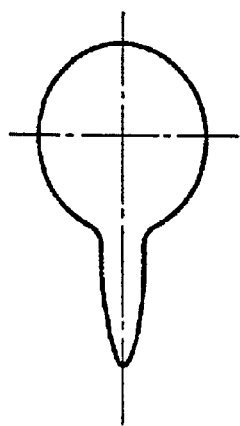
FIG. 6 shows a section along line B—B in FIG. 4.
Figure 7:
FIG. 7 shows a section along line C—C in FIG. 4.
Figure 14:
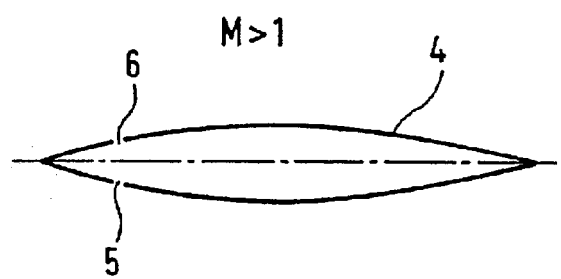
Figure 17:
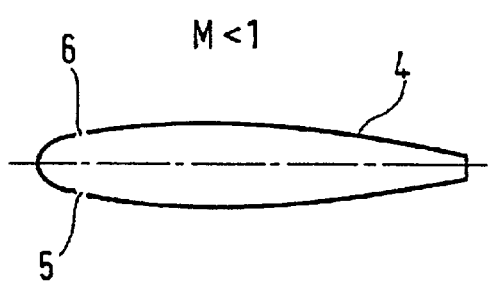
Figure 15:
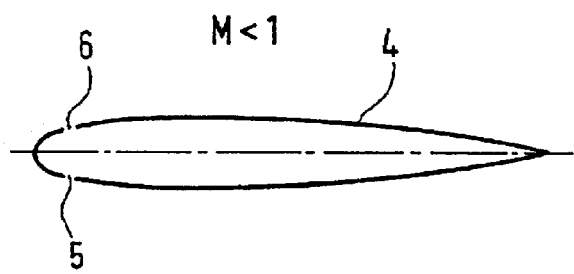
Figure 18:
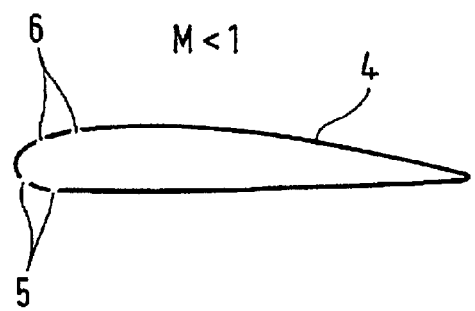
Figure 16:
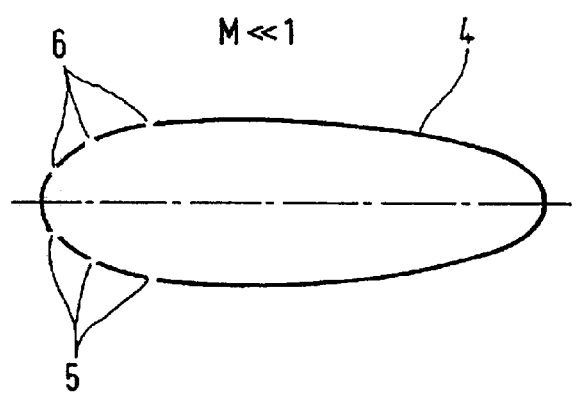
Figure 19:
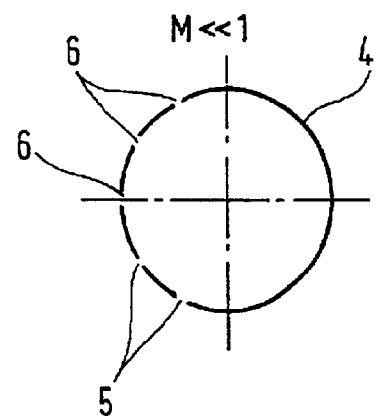

A variant embodiment of the proposed PST optimized for mounting on a main-route medium class passenger or transport aircraft is represented in FIGS. 1 to 3.

The Pitot-Static tube shown in FIGS. 20 to 26 comprises an axially symmetric body 29 in the nose part of which there is arranged an orifice 30 for determining the total pressure.

Located inside the axially symmetric body 29 are tubular electric heaters (TEHs) 32 of the Vanti-icing system. The axially symmetric body 29 is fastened to the strut 33, orifices 34, 35 for determining the angle of attack are arranged above the axially symmetric body 29 in relation to the base of the strut 33, and TEHs 36 are arranged inside the strut 33. Several orifices 34, 35 each may be arranged for the purpose of reserving orifices on the upper and lower surfaces of the cross section of the strut. Said orifices are arranged between the nose and the position of maximum thickness. The PST can be fastened to the fuselage with the aid of a flange 37. The pressure from the orifices 30, 34, 35 is led out of the PST with the aid of pneumatic paths 38 and nozzles 39, and the heating of the axially symmetric body and strut of the PST is effected with the aid of electric heaters 32, 36 by means of an electric connector 40. Static pressure is determined by means of orifices 44 in a plate arranged upstream of the strut 33.

The Pitot-Static tube operates in the following way. The pressure sensed by the orifices 30, 34, 35, 44 is transmitted via nozzles 39 to a transducer unit which converts the pressure into electric signals. These electric signals are sent to an information processing unit in which the flow (flight) parameters $P_0$, $P_s$, $\alpha$ are determined from calibration relationships. Electric energy is fed to the TEHs 32 and 36 via an electric connector 40 in order to prevent the formation of ice which can strongly distort the measurement or lead to clogging of the orifices and failure of the PST. The TEHs 32 and 36 heat the external shell of the axially symmetric body 29 and the strut 33, and also the pneumatic paths 38 which are, as a rule, produced from materials which are extremely good thermal conductors (for example, nickel). The power of the TEHs-and of the electric energy fed is selected so as to prevent the formation of ice on the surfaces of the axially symmetric body 29 and the strut 33, and in the orifices 30, 34, 35, 44.

For the purpose of simplifying the design of the axially symmetric body, and of additionally reducing the power consumed by the TEHs of the PST, the orifices 44 for tapping statio pressure (FIGS. 20 to 26) are arranged on a plate 45, which can be located on the fuselage of the FV. For the purpose of reducing the power required by the TEHs of the anti-icing system, they can be offset towards the nose part of the strut, which is most subject to icing (FIG. 20).

FIG. 23 depicts a different embodiment of a PST provided with an exit section on which at least one orifice 41 for tapping static pressure is arranged. Said orifice 41 is connected to a nozzle via a pneumatic path 42 and serves to enhance the accuracy of measurement of the static pressure in Mach number regions close to unity. Prior art PST comprise orifices for static pressure arranged on the axially symmetric body which are subject to pressure stabilization.

The pressure in the exit section is not subject to the phenomenon of stabilization (FIG. 28), and the static pressure is set in accordance with it on the basis of calibrations carried out earlier.

FIGS. 24 to 26 represent a variant of the embodiment of the proposed Pitot-Static tube, optimized for main-route medium class or transport aircraft.

In all embodiments shown the orifices arranged on the two surfaces of the strut permit reliable measurement even if one or several orifices are blockaded. Thus, total pressure $P_0$, static pressure $P_s$, and the angle of attack $\alpha$ and can be determined regardless of possible malfunction.

FIG. 27 presents an example of the functional relationship of the calibration slope $\chi_\alpha=) (P_6-P_7,)/(P_2-P_3)$ for determining the angle of attack for the proposed PST, and also for the prior-art PST, for which the orifices for determining the angle of attack are arranged on the conical part of the axially synmmetric body, where $P_i$ is the pressure measured in the corresponding the orifices. The numerals 2 and 3 denote orifices arranged correspondingly in the nose part and on the cylindrical surface of the axially symmetric body, both on the proposed PST and on the prior-art PST; the numerals 6 and 7 denote orifices arranged on the strut in the proposed PST or on the conical part of the axially symmetric body for the prior-art PST.

FIG. 28 shows the variation with Mach number in the ratio $P_{44}/P_{30}$ of the pressures measured correspondingly; $P_{44}$ on the plate upstream of the strut, $P_{30}$ in the nose part of the axially symmetric body, and the variation in Mach number of the ratio $P_{41}/P_{30}$, where $P_{41}$ is the pressure in the exit region of the aerodynamic profile of the strut.

The following can be achieved by using the invention:
design simplification,
a reduction in the overall dimensions of the axially symmetric body,
a lowering of the aerodynamic drag,
a reduction in the power required for the anti-icing system of the PST,
a lowering of the weight, and
an enhancement of the accuracy of measurement of the angle of attack.

Let us demonstrate this, assuming that the basic design, geometrical and aerodynamic parameters of the strut (height, angle of sweep, profile and its relative thickness) remain the same for the proposed PST as for the example of the prior art, since the design studies carried out indicate the possibility of this.

1. A design simplification is achieved by virtue of the fact that groups of orifices for pressure tapping, on the basis of which the angle of attack and static pressure are determined, are situated not on the axially symmetric body of the PST, but on the strut and plate of the PST, respectively. The design saturation of the PST is very high, since pneumatic paths go out from each of the indicated groups of orifices, and electric heating elements of the anti-icing system still have to be arranged inside the axially symmetric body and the strut. As a result of the transfer of the orifices for measuring the angle of attack and static pressure from the axially symmetric body to the strut and plate, the design saturation is lowered, and the construction of the axially symmetric body and the entire proposed PST with the strut is substantially simplified.

2. As a result of the transfer of the orifices for pressure tapping, which are used to determine the angle of attack and static pressure, from the axially symmetric body to the strut and plate, there is a substantial reduction in the diameter d of the axially symmetric body (FIG. 1). The design studies carried out indicate that the diameter d of the axially symmetric body of the proposed PST can, by comparison with the prior-art PST (given the same diameters of the internal paths and electric heating elements), be reduced by approximately 1.5–2 times, while the length l of the body can be reduced by 8–10 times.

3. The aerodynamic drag of the axially symmetric body can be represented as the formula $D=C_{xq}S$, where $C_x$ is the drag coefficient, q is the dynamic pressure, and S is the characteristic area For an axially symmetric body of the PST beyond the characteristic dimension, it is possible to adopt an area of its mid-section given by $S=\pi d^2/4$, where d is the diameter of the mid-section. Thus, if the axially symmetric body of the proposed PST were to be geometrically similar to the axially symmetric body of the prior-art PST (that is to say keeping to the same magnitude $C_s$), the drag of the axially synmetric body of the proposed PST would be reduced by approximately 2–2.4 times given the same dynamic pressures (that is to say given the same magnitude of the speed V and Mach number M) as a result of reduction in the diameter d by 1.5–2 times (see above, item 2). However, since the shape of the axially symmetric body of the proposed PST has no additional steps (of the conical part with a subsequent thickening of the diameter as in the case of the prior-art PST), there will be no flow separation on it, nor any occurrence of shock waves downstream of the conical part Thus, as estimates show, the magnitude of the drag coefficient $C_x$ of the axially symmetric body of the proposed PST can still be lowered by approximately 7–10%. As a result, the drag of the axially symmetric body X of the proposed PST is reduced for $\alpha=0$ by approximately 2.5–4.5 times. For angles of attack not equal to zero, the aerodynamic drag of the axially symmetric body can also be substantially lowered because of the reduction in its length (by 8–10 times). As estimates show, in this case a lowering of the drag of the axially symmetric body by 5–7times can be expected.

An additional lowering of the aerodynamic drag on the proposed PST can be ensured by virtue of the fact that the tail part of the axially symmetric body terminates and smoothly mates with the strut in the region of its maximum thickness. A positive effect is achieved in this case through the organization of the tail part, subjected to interference, of the axially symmetric body of the PST and the strut. Since, in this case, there is no additional diffiser in the region of the joint of the tapering tail part of the axially symmetric body and the tail part of the profile of the joint, success is thereby achieved in avoiding the occurrence of flow separation and local shock waves. As estimates indicate, the result is that the drag of the entire PST can be additionally lowered by 10–15%.

An additional lowering of the aerodynamic drag can be achieved by selecting specialized aerodynamic profiles for the strut of the PST which are tuned to corresponding basic flight regimes of the FV (supersonic regime with a sharp leading edge, or subsonic with a rounded leading edge of the aerodynamic profile of the strut).

4. The power required for the anti-icing heating system of the axially symmetric body of the proposed PST can also be very greatly lowered by comparison with the axially symmetric body of the prior-art PST. The power required for the same heat emission of the axially symmetric body and the same temperature of the surface is proportional to the area of its lateral surface, $\pi d l$, that is to say depends linearly on the diameter d of the PST and the length l. Since, in accordance with item 2, the diameter d of the axially symmetric body of the proposed PST can be reduced by 1.5–2 times, and its length can be reduced by 8–10 times, the power required for the anti-icing system of the axially symmetric body can be lowered by 12–20 times by comparison with the axially symmetric body of the prior-art PST.

Since, in the proposed PST, there is no need to feed power to heat the plate on which the orifices for measuring static pressure are situated owing to the absence of icing conditions on it (there being no regions of flow deceleration on it), while the power required to heat the strut is approximately equal to the power required to heat the strut of the prior-art PST, lowering of the power required for heating is determined by the lowering of the power required to heat the axially symmetric body. However, since the power required to heat the axially symmetric body of the prior-art PST is approximately equal to the power required for the strut, the result, according to approximate estimates, is that the required power of the electric heaters on the proposed PST can be lowered by approximately 50% by comparison with the prior-art PST.

In addition, a reduction in the power required to heat the PST can be obtained by virtue of the offsetting of the TEHs towards the leading edge of the strut, since it is a region adjoining its leading edge which is most subject to the formation of ice on it.

5. Since the staggering of the orifices on the plate for measuring static pressure (without the introduction of corrections to the overpressure) relative to the base of the strut of the PST can be appreciably reduced because of its sweep by comparison with the corresponding orifices of the prior-art PST on the axially symmetric body, the weight of the plate and the axially symmetric body of the proposed PST can, as indicated by preliminary design studies, be approximately equal to the weight of the external shell of the axially symmetric body of the prior-art PST. As a result, the lowering of the design weight of the proposed PST occurs only by virtue of the lowering of the mass of the heaters the axially symmetric body. This lowering of the weight is approximately 15–20% of the weight of the PST.

6. An increase in the accuracy of measurement of the angle of attack on the proposed PST by comparison with the prior-art PST is achieved as a result of the fact that the orifices for tapping pressures by means of which the angle of attack is determined are arranged on a strut having cross sections in the form of an aerodynamic profile, and not on the conical part of the axially symmetric body. It may be seen from the functional relationships, represented in FIG. 27, of the slope ($\alpha$), which are obtained on the basis of experimental data, that the derivative for the orifices on the aerodynamic profile in the range of angles of attack of $\alpha=0$–$20°$ is substantially ($\approx 5$ times) greater than for the orifices arranged on the conical surface of the axially symmetric body of the prior-art PST. The error in the determination of the angle of attack can be written in the form of $\delta\alpha=d\alpha/d_{\chi\alpha}*\delta p/q$, where q is the dynamic pressure and $\delta p$ is the error in the measurement of the pressure difference $P_{35}$-$P_{34}$. Thus, for an error in real pressure transducers of p=0.15 mm mercury column with M=0.2, the error in the measurement of the angle of attack in the indicated range of angles of attack has a magnitude of 0.08° on the proposed PST, but of 0.40 for the prior-art PST. Thus, the accuracy of determination of the angle of attack rises by 5 times for the proposed PST.

7. Since it is possible on the proposed PST to select the base pressure from the side of the exit section of the aerodynamic profile of the strut, while the base pressure is a monotonic function of the Mach number and is not subject to the phenomenon of transonic stabilization (compare the character of the changes in the magnitudes $P_{41}/P_{30}$ and $P_{44}/P_{30}$ in FIG. 28), it is possible, as experiments show, to enhance the accuracy of measurement of static pressure for M$\approx$1.0 in the given variant of the proposed PST.

Thus, the given results of the calculated estimates and the design and planning studies clearly indicate the advantages for all the indicated parameters and properties of the proposed PST by comparison with the prior-art PST.

Since, as a rule, there are several such PST on an aircraft, this leads to an appreciable lowering of the weight and of the aerodynamic drag, and to a saving in the electric energy required.

What is claimed is:

1. A Pitot-Static tube assembly comprising: three groups of orifices for determining the total pressure, static pressure and angle of attack; a strut, an axially symmetric body on the strut; and a plate upstream of the strut; pneumatic paths arranged between the body and the strut; electric heating elements in the body, wherein the orifices for measuring the static pressure are arranged on the plate.

2. A Pitot-Static tube according to claim 1, in which the orifices for determining the angle of attack are arranged on the strut.

3. A Pitot-Static tube according to claim 1, in which the axially symmetric body terminates and mates smoothly with the strut in a region of its maximum thickness.

4. A Pitot-Static tube according to claim 1, in which the plate with the orifices for measuring static pressure is constructed separately from the axially symmetric body with the strut.

5. A Pitot-Static tube according to claim 1, in which the strut has cross sections having a supersonic aerodynamic profile with a sharpened leading edge.

6. A Pitot-Static tube according to claim 1, in which the strut has cross sections having dynamic profile with a rounded nose.

7. A Pitot-Static tube according to claim 1, in which an external surface of the strut is a cylindrical surface.

8. A Pitot-Static tube according to claim 1, in which the orifices for measuring the angle of attack on the strut are arranged from a nose of the strut up to the maximum thickness of the aerodynamic profile.

9. A Pitot-Static tube according to claim 1, in which the electric heating elements inside the strut are offset towards a nose of the strut.

10. A Pitot-Static tube according to claim 1, in which the orifices for determining the angle of attack on the strut are disposed above the axially symmetric body in relation to the base of the strut.

11. A Pitot-Static tube according to claim 1, in which the strut comprises an exit section and at least one additional orifice on the exit section for tapping the static pressure.

* * * * *

UNITED STATES PATENT AND TRADEMARK OFFICE
CERTIFICATE OF CORRECTION

PATENT NO. : 6,813,942 B1 Page 1 of 1
DATED : November 9, 2004
INVENTOR(S) : Vozhdaev, Yevgeny Semenovich et al.

It is certified that error appears in the above-identified patent and that said Letters Patent is hereby corrected as shown below:

<u>Title page,</u>
Item [75], Inventors, reading "Andrei Aleksandrovich Efenov" should read -- Andrei Aleksandrovich Efremov --.

Signed and Sealed this

Sixth Day of September, 2005

JON W. DUDAS
*Director of the United States Patent and Trademark Office*